US009801227B2

(12) United States Patent
Jain et al.

(10) Patent No.: US 9,801,227 B2
(45) Date of Patent: Oct. 24, 2017

(54) SYSTEMS AND METHODS FOR IMPLEMENTING BEARER CALL-BACK SERVICES

(71) Applicant: Cisco Technology, Inc., San Jose, CA (US)

(72) Inventors: Paras Jain, Bangalore (IN); Vimal Srivastava, Bangalore (IN); Chitresh Yadav, Bangalore (IN); Pankaj Tripathi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 365 days.

(21) Appl. No.: 14/288,467

(22) Filed: May 28, 2014

(65) Prior Publication Data

US 2015/0351147 A1 Dec. 3, 2015

(51) Int. Cl.
| | | |
|---|---|---|
| *H04W 4/00* | (2009.01) | |
| *H04W 76/02* | (2009.01) | |
| *H04W 28/02* | (2009.01) | |
| *H04L 29/06* | (2006.01) | |
| *H04L 12/825* | (2013.01) | |
| *H04L 12/801* | (2013.01) | |

(52) U.S. Cl.
CPC .......... *H04W 76/027* (2013.01); *H04L 47/12* (2013.01); *H04L 47/266* (2013.01); *H04L 65/104* (2013.01); *H04L 65/1069* (2013.01); *H04L 65/80* (2013.01); *H04W 28/0247* (2013.01); *H04W 28/0252* (2013.01)

(58) Field of Classification Search
CPC .................................................... H04W 28/04
USPC ........................................................ 370/329
See application file for complete search history.

(56) References Cited

U.S. PATENT DOCUMENTS

| | | | |
|---|---|---|---|
| 2012/0198081 A1* | 8/2012 | Zhao ..................... | H04L 47/765 709/227 |
| 2014/0119192 A1 | 5/2014 | Koshimizu et al. | |
| 2015/0103665 A1* | 4/2015 | Kaippallimalil ...... | H04W 76/02 370/235 |

FOREIGN PATENT DOCUMENTS

| | | |
|---|---|---|
| EP | 2731375 | 5/2014 |
| EP | 2950504 | 12/2015 |

OTHER PUBLICATIONS

EPO Oct. 20, 2015 Extended Search Report and Written Opinion from European Application Serial No. 15169495.7 6 pages.

(Continued)

*Primary Examiner* — Samina Choudhry
(74) *Attorney, Agent, or Firm* — Patterson + Sheridan, LLP

(57) ABSTRACT

The present disclosure is directed at systems, methods and media for providing bearer call-back services for bearers that have been rejected or pre-empted by a network apparatus in a core network. In some embodiments, if a network apparatus enters a state in which it becomes necessary to reject or pre-empt a bearer associated with a user equipment (UE) (e.g., due to load conditions in a radio access network, the core network, or an application server), the network apparatus can send to the UE a call-back message when the network apparatus exits the state that precipitated the bearer rejection or pre-emption. By sending a call-back message, the network apparatus can save the UE from multiple unsuccessful attempts to establish a bearer, or from waiting an unnecessarily long time before establishing a bearer.

18 Claims, 11 Drawing Sheets

(56) References Cited

OTHER PUBLICATIONS

"3GPP TS 23.401 V9.15.0 (Mar. 2013) Technical Specification: $3^{rd}$ Generation Partnership Project Group Services and System Aspects; General Packet Radio Service (GPRS) enhancements for Evolved Universal Terrestrial Radio Access Network (E-UTRAN) access (Release 9)," 3GPP Draft; 23401-9F0, 3GPP, Mobile Competence Centre; 650 Route Des Lucioles; F-06921 Sophia-Antipolis Cedex; France; Mar. 2013.

* cited by examiner

| UE Identifier 404 | Network Identifier 406 | Callback Service Requested 408 | Reference code 410 |
|---|---|---|---|
| UE 1 | Network A | YES | Random cookie 1 |
| UE 2 | Network A | NO | n/a |
| UE 3 | Network B | YES | Random cookie 3 |
| UE 4 | Network A | YES | Random cookie 4 |
| UE 5 | Network B | NO | n/a |

| Reference cookie 504 | Application 506 |
|---|---|
| Random cookie 1 | Application 1 |
| Random cookie 2 | Application 2 |
| Random cookie 3 | Application 3 |
| Random cookie 4 | Application 4 |
| Random cookie 5 | Application 5 |

SYSTEMS AND METHODS FOR IMPLEMENTING BEARER CALL-BACK SERVICES

FIELD OF THE DISCLOSURE

This disclosure relates generally to systems, methods, and media for providing bearer call-back services in wireless network communications.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, typically do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

The Long-Term Evolution (LTE) standard is an exemplary standard for wireless communication of high-speed data for mobile phones and data terminals. The standard as developed by the $3^{rd}$ Generation Partnership Project (3GPP). A 3GPP LTE network is a connection-oriented transmission network and, as such, requires the establishment of a "virtual" connection between two endpoints, such as between a User Equipment (UE) and a Packet Data Network Gateway (PGW). These virtual connections are referred to as "bearers." To avoid network congestion, the PGW in a given 3GPP LTE operator network can sometimes pre-empt existing bearers which are connected to a particular Access Point Name (APN) or Packet Data Network (PDN), or reject requests from UEs to create new bearers.

BRIEF DESCRIPTION OF THE DRAWINGS

FIG. 4 depicts an exemplary data table that can be used to keep track of which UE/access network connections should be given callback services, and reference cookies associated with each connection, according to some embodiments.

FIG. 5 depicts an exemplary data table that can be used to keep track of which UE applications are associated with certain reference cookies, according to some embodiments.

DESCRIPTION OF EXAMPLE EMBODIMENTS

Summary of the Invention

Figure 1:
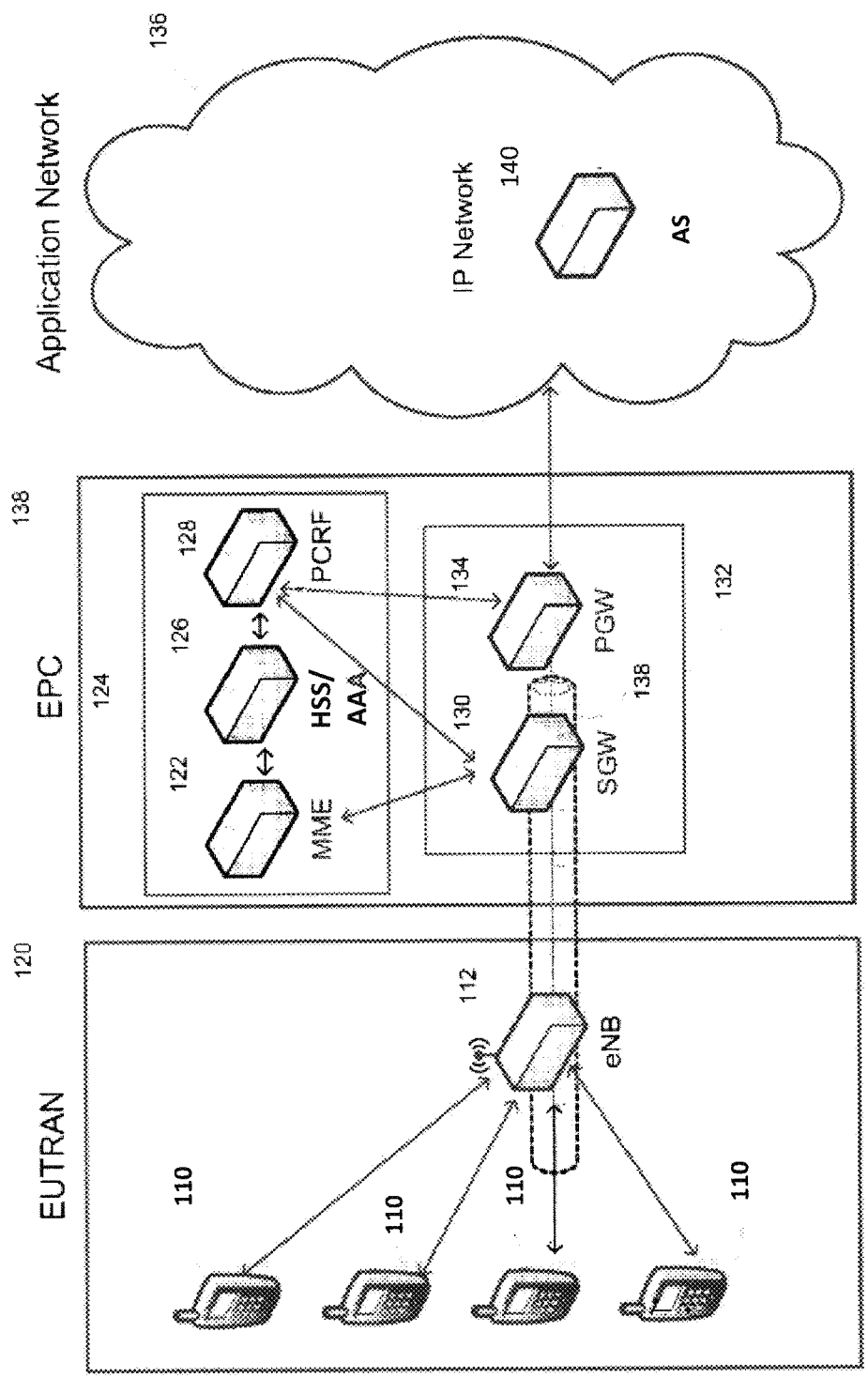
FIG. 1 is a schematic diagram showing the network nodes in an EPC network, according to some embodiments.

The present disclosure is directed at systems and methods for implementing bearer call-back services.

In one aspect, the present disclosure is directed at a network apparatus in a core network, comprising an interface configured to communicate with user equipments (UEs) via a wireless network, a memory, and a processor in communication with the interface and the memory. The network apparatus can be configured to send, at a first time, a rejection message to a UE indicating that a bearer associated with the UE is rejected or pre-empted, the rejection message including a reference cookie. The network apparatus can also be configured to send at a second time, a callback message indicating to the UE that the network apparatus is able to accept a new bearer associated with the UE, the callback message including the reference cookie.

In some embodiments, the rejection message to the UE can be sent in response to a request from the UE to create a new bearer between the UE and the network apparatus.

In some embodiments, the rejection message to the UE can be sent when the network apparatus determines that an existing bearer between the UE and the network apparatus should be pre-empted.

In some embodiments, the rejection message can give the UE an option to (i) establish a bearer immediately, or (ii) voluntarily delay establishing a bearer until the network apparatus sends, at the second time, the callback message, and wherein the callback message is sent at the second time only if the network apparatus receives an indication from the UE that the UE has chosen to voluntarily delay establishing a bearer.

In some embodiments, the network apparatus can determine when to send the rejection message and the callback message based on (i) load conditions at a packet data network gateway (PGW), (ii) load conditions at an application server (AS), or (iii) load conditions at a radio base station.

In some embodiments, the network apparatus can be a packet data network gateway (PGW). In other embodiments, the network apparatus can be a policy charging rules function (PCRF).

In some embodiments, the network apparatus can be further configured to receive a request from the UE for the callback message, and to provide the callback message only if the request is received.

In another aspect, the present disclosure is directed at a method for providing bearer callback services. The method can comprise sending, to a user equipment (UE) from a network apparatus, at a first time, a rejection message indicating that a bearer associated with the UE is rejected or pre-empted, the rejection message including a reference cookie. The method can also comprise sending, to the UE from the network apparatus, at a second time, a callback message indicating that the network apparatus is able to accept a new bearer associated with the UE, the callback message including the reference cookie.

In some embodiments, the rejection message to the UE in the above method is sent in response to a request from the UE to create a new bearer between the UE and the network apparatus.

In some embodiments, the rejection message to the UE in the above method is sent when the network apparatus determines that an existing bearer between the UE and the network apparatus should be pre-empted.

In some embodiments, the rejection message in the above method gives the UE an option to (i) establish a bearer immediately, or (ii) voluntarily delay establishing a bearer until the network apparatus sends, at the second time, the callback message. The method can also further comprise receiving, at the network apparatus from the UE, an indication that the UE has chosen to (i) establish the bearer immediately, or (ii) voluntarily delay establishing the bearer. The callback message in the above method can also be sent at the second time only if the network apparatus receives an indication from the UE that the UE has chosen to voluntarily delay establishing a bearer.

In some embodiments, the method can further comprise determining to send the rejection message based on (i) load conditions at a packet data network gateway (PGW), (ii) load conditions at an application server (AS), or (iii) load conditions at a radio base station. The method can also comprise determining to send the callback message based on (i) load conditions at the PGW, (ii) load conditions at the AS, or (iii) load conditions at the radio base station.

In some embodiments, the network apparatus in the above method can be a packet data network gateway (PGW). In other embodiments, the network apparatus in the above method can be a policy charging rules function (PCRF).

In some embodiments, the method can further comprise receiving, at the network apparatus, a request from the UE for the callback message. The callback message in the above method can be sent only if the request is received.

In yet another aspect, the present disclosure is directed at a user equipment (UE) apparatus, comprising an interface configured to communicate with a wireless network, a memory, and a processor in communication with the interface and the memory. The UE apparatus can be configured to receive, at a first time, a rejection message from a network apparatus indicating that a bearer associated with the UE apparatus is rejected or pre-empted, the rejection message including a reference cookie. The UE apparatus can also be configured to associate the reference cookie with an application or a Quality of Service (QoS) indicator, and store the association in the memory. The UE apparatus can be further configured to receive, at a second time, a callback message from the network apparatus indicating that the network apparatus is able to accept a new bearer associated with the UE, the callback message including the reference cookie, and to establish, in response to the callback message, a new bearer with the network apparatus, wherein the new bearer is associated with either the application associated with the reference cookie, or the QoS indicator associated with the reference cookie.

In some embodiments, the UE apparatus can be further configured to determine, in response to the rejection message, whether to (i) establish a bearer immediately, or (ii) voluntarily delay establishing a bearer until the callback message is received from the network apparatus at the second time. If the UE apparatus determines to establish the bearer immediately, the UE apparatus can send a request to the network apparatus to establish the bearer immediately. If the UE apparatus determines to voluntarily delay establishing the bearer, the UE apparatus can send a delay acknowledgement message to the network apparatus indicating that it is voluntarily delaying establishing the bearer, and requesting the callback message at the second time.

In some embodiments, the determination in the UE apparatus in response to the rejection message can be based on input received from a user of the UE apparatus.

In some embodiments, the UE apparatus can be further configured to send to the network apparatus a request for the callback message.

Overview

An evolved packet core (EPC) network may include one or more cellular telephones or other mobile devices, called user equipment (UE); a radio transceiver/base station, called an eNodeB; a control node, called a mobile management entity (MME), which is responsible for tracking and paging the UE, as well as for selecting the serving gateway; a serving gateway (SGW), which routes and forwards user data packets and serves as a mobility anchor for the UE; and a packet data network gateway (PGW), which provides connectivity for the UE to external packet data networks and performs policy enforcement and charging (PCEF). As well, other network nodes, such as a home subscriber server/authentication, authorization and accounting server (HSS/AAA server) and a policy charging and rules function (PCRF) server, may serve additional functions. Through the PGW, the EPC connects to applications such as voice telephony or public Internet data service, which may reside on an IP Multimedia Subsystem (IMS) network or on another IP network. Although an EPC network with EPS bearers and PDN gateways is described below, other types of networks may be used to implement the bearer call-back services described below, particularly network technologies that use IP tunnels with a specified QoS and bandwidth, such as PDP contexts in GPRS networks. Such other networks can also include base stations and gateways and have a core network, and may specifically include 3G networks.

Quality of Service (QoS) is often implemented on wireless networks. Quality of service relates to the ability to provide different priority to different applications, users, or data flows, or to guarantee a certain level of performance to a data flow. For example, a required bit rate, delay, jitter, packet dropping probability, and/or bit error rate may be guaranteed. Quality of service guarantees can be important (a) if the network capacity is insufficient, especially for real-time streaming multimedia applications such as Voice-over-IP (VOIP), online games, and IP-TV, since these applications often require fixed bit rate and are delay sensitive; or (b) in networks in which capacity is a limited resource, for example, in cellular data communication.

The evolved packet core may use a EUTRAN to provide its physical layer. EUTRAN stands for the Evolved Universal Terrestrial Radio Access Network. The underlying air interface uses orthogonal frequency division multiple access (OFDMA) technology to provide higher data rates and lower latency, and is optimized for packetized data traffic. User equipment (UE) attaches to an evolved NodeB (eNodeB) to access the network. In doing so, the UE requests radio resources from the eNodeB to establish a radio bearer. Once the radio bearer is established, the UE initiates a request for an EPS bearer.

An EPS bearer is part of a point-to-point virtual data connection from the UE to destinations on one or more packet data networks (PDNs). The EPS bearer resides in the end-to-end connection between the UE and the remote IP endpoint. The UE first connects to the eNodeB via a radio access bearer; the eNodeB then establishes an EPS bearer to the PGW; finally, the PGW establishes an external IP tunnel or connection to the desired resource on the IP network. Multiple bearers may be established by a single UE.

An EPS bearer is characterized by its two endpoints, and also by per-bearer quality of service (QoS) information. This information is used by the PGW and upstream network nodes to effectively prioritize packet flows over the specified EPS bearer. EPS bearers may be associated with a QoS class identifier (QCI) and an allocation and retention priority (ARP) parameter. If the EPS bearer has a quality of service that is higher than best effort (a QoS level that is considered low), the bearer may also be associated with parameters that disclose a guaranteed bit rate (GBR) and a maximum bit rate (MBR).

FIG. 1 is a schematic diagram of network nodes in an Evolved Packet Core network. In FIG. 1, a plurality of UE 110s are connected to eNodeB 112, each UE 110 being connected to eNodeB 112 via its own radio bearer. The UEs and eNodeB 112 together form Evolved Universal Terrestrial Radio Access Network (EUTRAN) 120. ENodeB 112 is connected to a Mobile Management Entity (MME) 122, which is part of an EPC Control Plane 124, together with a Home Subscriber Server/Authentication, Authorization and Accounting (HSS/AAA) server 126 and Policy Control Rules Function (PCRF) 128. The nodes 122, 126 and 128 that form the control plane 124 perform management functions for the UEs connected to the network. Management signaling between UE 110 and network nodes, primarily with MME 122, passes through the control plane and is separate from regular packet data traffic.

ENodeB 112 is also connected to a Serving Gateway (SGW) 130, which is part of EPC data plane 132, together with a Packet Gateway (PGW) 134. SGW 130 provides mobility management for UE 110, while PGW 134 provides access to packet data network (PDN) 136. PDN 136 can include an application server (AS) 140. Regular packet data traffic between UE 110 and PDN 136 travels over the data plane, without passing through the control plane. Although SGW 130 and PGW 134 are part of the data plane, they communicate with MME 122 and other nodes in the control plane. Together, the control plane and the data plane form an evolved packet core (EPC) 138. Applications such as Voice-over-IP (VOIP) voice and video calling, and email and World Wide Web (WWW) services (not shown), can be accessed via PDN 136. UE 110 communicates with PGW 136 over an IP tunnel 138, which consists of a radio access bearer between UE 110 and eNodeB 112 and an EPS bearer between eNodeB 112 and PGW 134. PGW 134 and PDN 136 may communicate over an IP tunnel or via an ordinary IP traffic flow.

In some embodiments, bearer activation occurs as follows. UE 110 connects to eNodeB 112 and sends a UE Attach request. ENodeB 112 provisions a radio access bearer and forwards the Attach request to MME 122. MME 122 selects SGW 130 as the mobility anchor for UE 110, and also requests access to packet data network 136 via PGW 134. PGW 134 subsequently establishes an EPS bearer connecting PGW 134 to eNodeB 112, and an external bearer to IP network 136. An end-to-end bearer 138 is thus formed between UE 110 and PDN 136.

Call admission control is the procedure for determining whether a new bearer can attach to a PGW. When eNodeB 112 requests setup of an EPS bearer 138 at PGW 134, PGW 134 must assess whether it has the capability to provide service over a new bearer. To make the assessment, PGW 134 evaluates various load and congestion characteristics, which may include the amount of bandwidth currently in use at the PGW, CPU load, number of active bearers, sessions or PDP sessions, and memory usage. PGW 134 may also evaluate the load and congestion characteristics at AS 140 attached to a particular PDN 136. Various methods for handling high load at PGW 134 or AS 140 may be used, such as load balancing, dropping existing PDP sessions or EPS bearers, or refusing to accept new EPS bearers.

For example, scenarios in which a UE's existing bearer can be pre-empted, or a UE's bearer creation request can be rejected, include (but are not limited to):

- The number of bearer-creation requests exceeds a predetermined UE-system-bearer limit. Some operators, for example, permit only 8 bearers per PDN per UE.
- Congestion in AS 140 is detected at PGW 134.
- There are insufficient available resources at PGW 134 to meet the Guaranteed Bit Rate (GBR).
- PGW 134 may wish to save resources for other, more critical services. For example, an operator may have a policy to delay certain types of less critical services (e.g., peer-to-peer file sharing) for a certain set of users, so that these services become available only after a certain time, or only when a certain amount of network resources are available.
- There may be insufficient radio resources at eNodeB 112 to accommodate a new bearer between UE 110 and PGW 134.

One way that a UE may respond when its bearer creation request is rejected and/or its existing bearer is pre-empted is to retry bearer creation after a certain time. This delay time may be either randomly determined, or may correspond to a predetermined programmable parameter. However, eNodeB 112, PGW 134 and/or AS 140 may remain congested even after the random or pre-determined time has expired. This could lead to multiple unnecessary rejections of a dedicated bearer setup request by the UE. Alternatively, eNodeB 112, PGW 134 and/or AS 140 may become un-congested long before the random or pre-determined time has expired. This could lead to an unnecessary delay in setting up a new bearer for the UE.

This disclosure includes embodiments of a call-back service that makes it easier to recreate for a UE a pre-empted bearer, or create for a UE a new bearer that had previously been rejected, when the network is ready to create new bearers for that UE or PDN. According to some embodiments, PGW 134 can generate a random unique number/reference cookie and send it along with the Delete Bearer or Reject Bearer message. Subsequently, when the network is ready to create new bearers for that UE or PDN, PGW 134 can send to the UE a callback message that the UE can now proceed to create a new bearer. The notification sent to the UE by PGW 134 can include the random unique number/ reference cookie that can be used by the UE to correlate the callback message with the application that had previously been pre-empted or rejected.

Figure 2A:
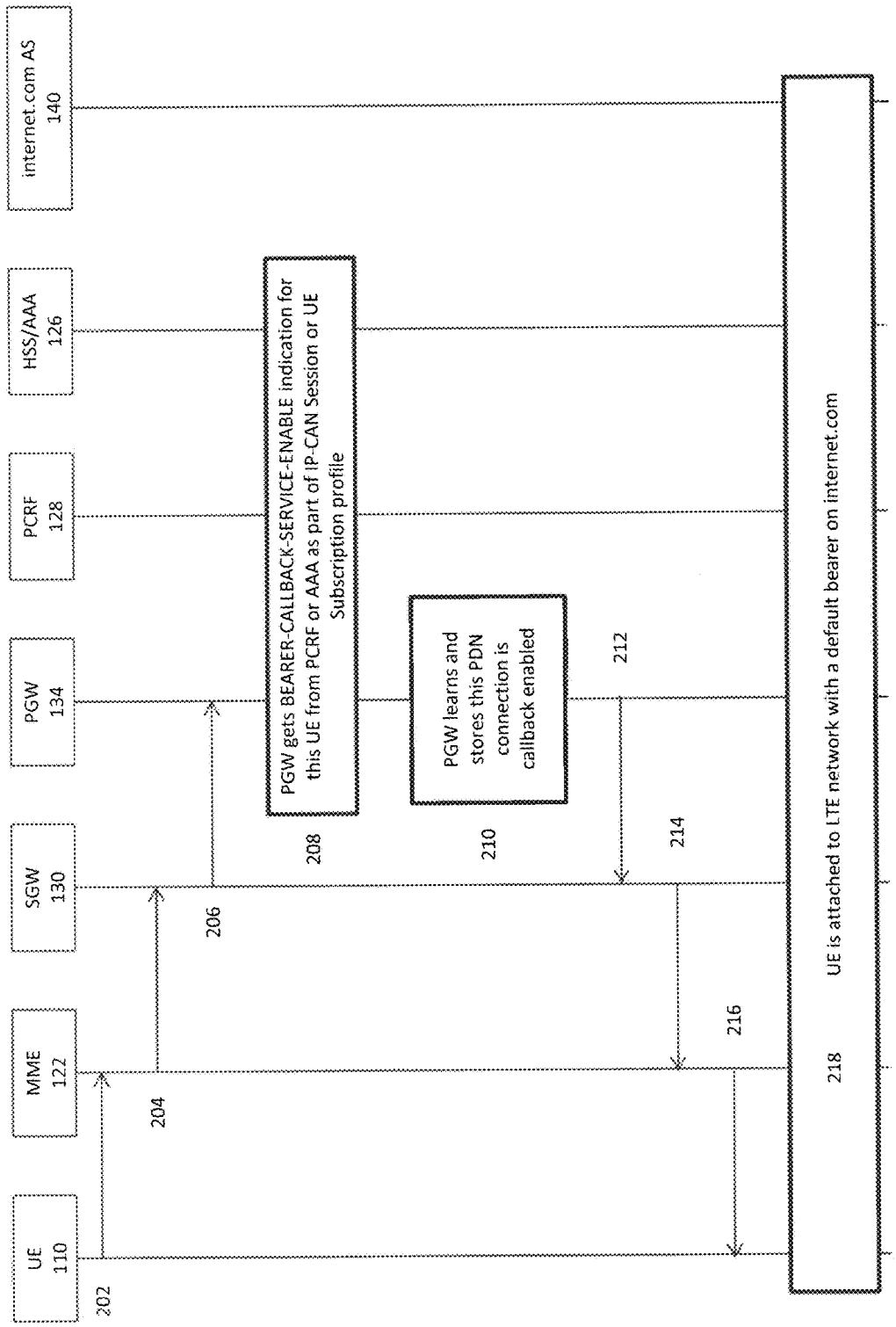
FIGS. 2A and 2B are exemplary call flow diagrams illustrating a method for providing callback services from a packet data network gateway (PGW), according to some embodiments.
Figure 2B:
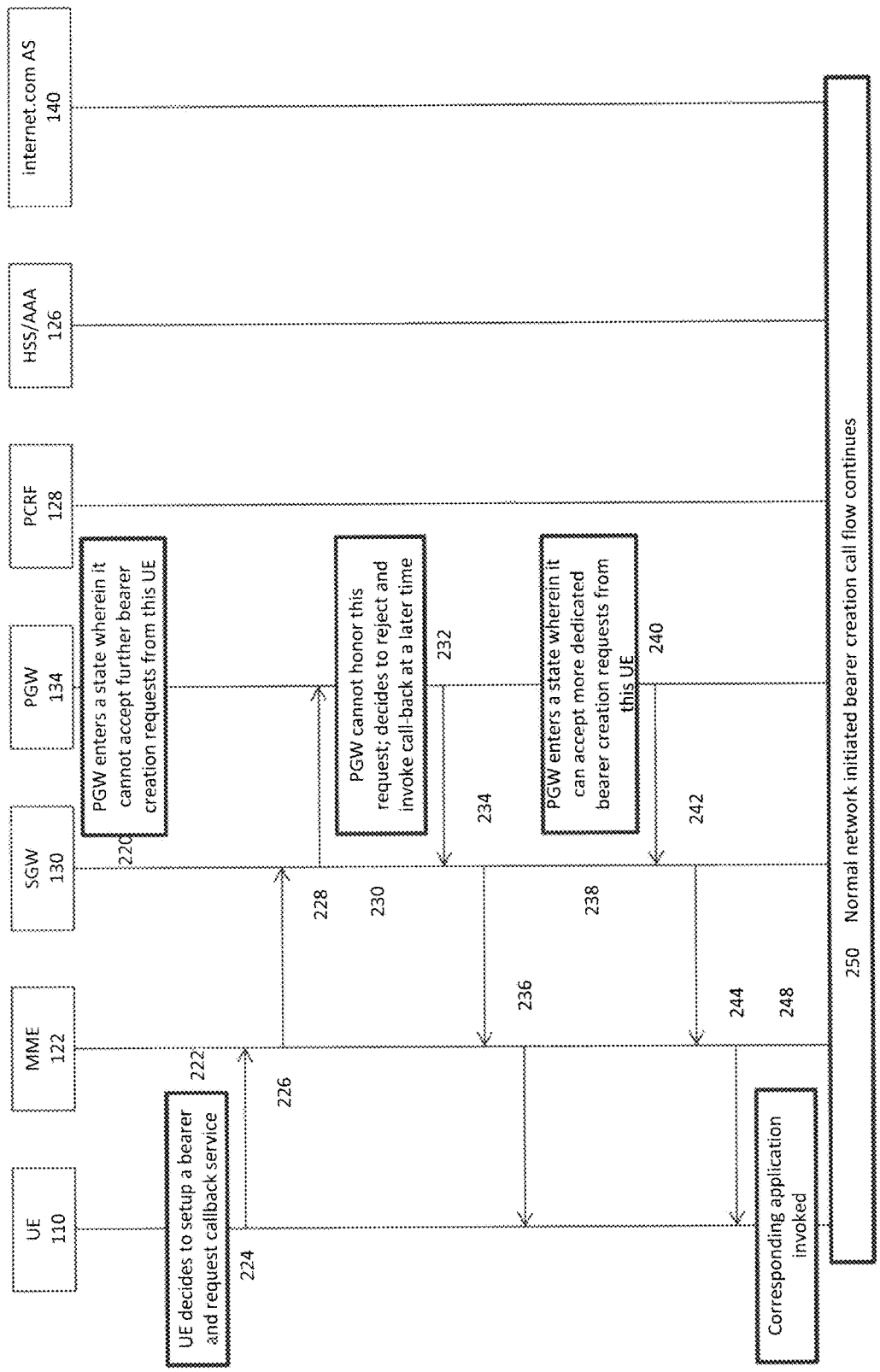

FIGS. 2A and 2B depict an exemplary call flow according to some embodiments in which the exemplary internet.com application server 140 is not controlled by the service provider that provisions PGW 134 and PCRF 128. In FIG. 2A, UE 110 sends an Initial Attach message to MME 122 (flow 202). MME 122 then forwards the Initial Attach message to SGW 130 (flow 204), which then forwards the message to PGW 134 (flow 206). PGW 134 then receives an indication from either PCRF 128 or HSS/AAA 126 that this UE 110 should (or should not) receive bearer callback services (step 208). The indication that UE 110 should receive bearer callback services can be obtained from the user profile for UE 110 stored in PCRF 128 or HSS/AAA 126. Once PGW 134 receives this indication, PGW 134 can then store in local memory a record that this PDN connection for this UE is callback enabled (step 210). PGW 134 can then send a response to SGW 130 that UE 110's attach request has been accepted (flow 212), which is then forward to MME 122 (flow 214) and then to UE 110 (flow 216). This response can include an indication to UE 110 that its connection is callback-enabled. By step 218, the UE 110 is attached to the LTE network with a default bearer on internet.com.

In FIG. 2B, PGW 134 enters a state in which it cannot accept further bearer creation requests from this UE (step 220). As discussed above, this can occur due to various factors, such as excessive load or congestion at either eNodeB 112, PGW 134 or AS 140. Subsequently, UE 110 decides to setup a new dedicated bearer associated with a certain application (e.g., a peer-to-peer file-sharing application) and request callback service (step 222). UE 110 sends a dedicated bearer-setup request with a callback service indication to MME 122 (flow 224), which is then forwarded to SGW 130 (flow 226) and to PGW 134 (flow 228). In some embodiments, this bearer-setup request can take the form of a Dedicated-Bearer-Setup command between UE 110 and MME 122, and a Bearer-Resource-Command from MME 122 to SGW 130, and from SGW 130 to PGW 134. Since PGW 134 cannot accept further bearer creation requests, PGW 134 rejects the bearer creation request (step 230). At this step, PGW 134 can examine the bearer-setup request from UE 110 to see if UE 110 invoked a callback request. If UE 110 requested callback services, PGW 134 can then examine its local memory and determine that the PDN connection for this UE is callback enabled. If the PDN connection for this UE 110 is callback enabled and if UE 110 requested callback services, PGW 134 can generate a random unique number/reference cookie. PGW 134 can then send a rejection message (in some embodiments, this can take the form of a Bearer Resource Command (BRC) Failure message) along with the generated reference cookie to SGW 130 (flow 232), which is then forwarded to MME 122 (flow 234) and then to UE 110 (236). The call-back service can thus be requested by the UE or can be provided by the network without a request.

When UE 110 receives the rejection message with the generated reference cookie, it now knows that its bearer creation request associated with the application is rejected because PGW 134 is currently unable to accept new requests, but that PGW 134 will send a callback message when it is able to accept new bearer creation requests. In some embodiments, UE 110 then associates the reference cookie with the application (e.g., the peer-to-peer file-sharing application) and saves the cookie and the association into local memory. In other embodiments, UE 110 can associate the reference cookie with the QoS of the bearer that was rejected.

At a later time, PGW 134 enters a state wherein it can accept dedicated bearer creation requests from this UE (step 238). PGW 134 then checks its local memory and determines that it needs to give UE 110 a callback message. PGW 134 then sends a callback message containing the previously generated reference cookie to SGW 130 (flow 240), which is then forwarded to MME 122 (flow 242) and then to UE 110 (flow 244). When UE 110 receives the callback message with the reference cookie, it knows that PGW 134 is now able to accept more dedicated bearer creation requests. UE 110 then examines its local memory to determine the application associated with the received reference cookie, and invokes the corresponding application (e.g., the peer-to-peer file-sharing application) (step 248). In other embodiments, UE 110 examines its local memory to determine the QoS of the bearer that had previously been rejected, and then invokes an application that uses the determined QoS. The network then initiates normal network initiated bearer creation call flows (step 250).

The call flows described above in reference to FIGS. 2A and 2B can be adapted for other embodiments. For example, while FIG. 2B illustrates the case where a UE decides to setup a new bearer, the call flow can be adapted for the case where PGW 134 pre-empts an existing bearer between UE 110 and PGW 134. In this case, PGW 134 could send a pre-emption message instead of a rejection message to UE 110 via SGW 130 and MME 122, along with the generated reference cookie. When PGW 134 enters a state where it can resume the pre-empted bearer, PGW 134 could send a callback message to UE 110 via SGW 130 and MME 122 as described above.

The call flows described above in reference to FIGS. 2A and 2B can also be adapted for embodiments in which UE 110 is given a choice to continue or terminate its connection to AS 140. As an example, rather than completely rejecting UE 110's new bearer request, or pre-empting UE 110's existing bearer, PGW 134 can give UE 110 a choice to (i) continue setting up a new bearer, or to continue using its existing bearer, or (ii) abandon its attempt to setup a new bearer or continue using its existing bearer. UE 110 can choose between options (i) and (ii) based on user input supplied by a user of the UE, or automatically based on predetermined programmable parameters. If UE 110 chooses to abandon its attempt to setup a new bearer or continue using its existing bearer, PGW 134 can send UE 110 a callback message when connection conditions are more favorable, e.g., the network can accept new bearers at a lower cost, or the network can provide better QoS. In this way, UE 110 can choose to discontinue its connection now in favor of a connection later when connection conditions are more favorable, e.g., the costs of remaining connected will be lower, or when the network can provide better QoS. This feature can be useful for allowing UE 110 to voluntarily delay certain applications to times of the day when network traffic is generally lower to take advantage of cheaper connection rates or faster data transfer speeds. In this case, PGW 134 could send a delay notification instead of a rejection message to UE 110 via SGW 130 and MME 122, along with the generated reference cookie. If UE 110 elects to abandon its attempt to setup a new bearer or continue using its existing bearer, UE 110 can send a delay-accept message to PGW 134 via MME 122 and SGW 130. When PGW 134 enters a state in which it can provide more favorable connections, e.g., accept new bearers at a cheaper rate (according to an operator's policy) or at a certain QoS level, PGW 134 could send a callback message to UE 110 via SGW 130 and MME 122 as described above.

Figure 3A:
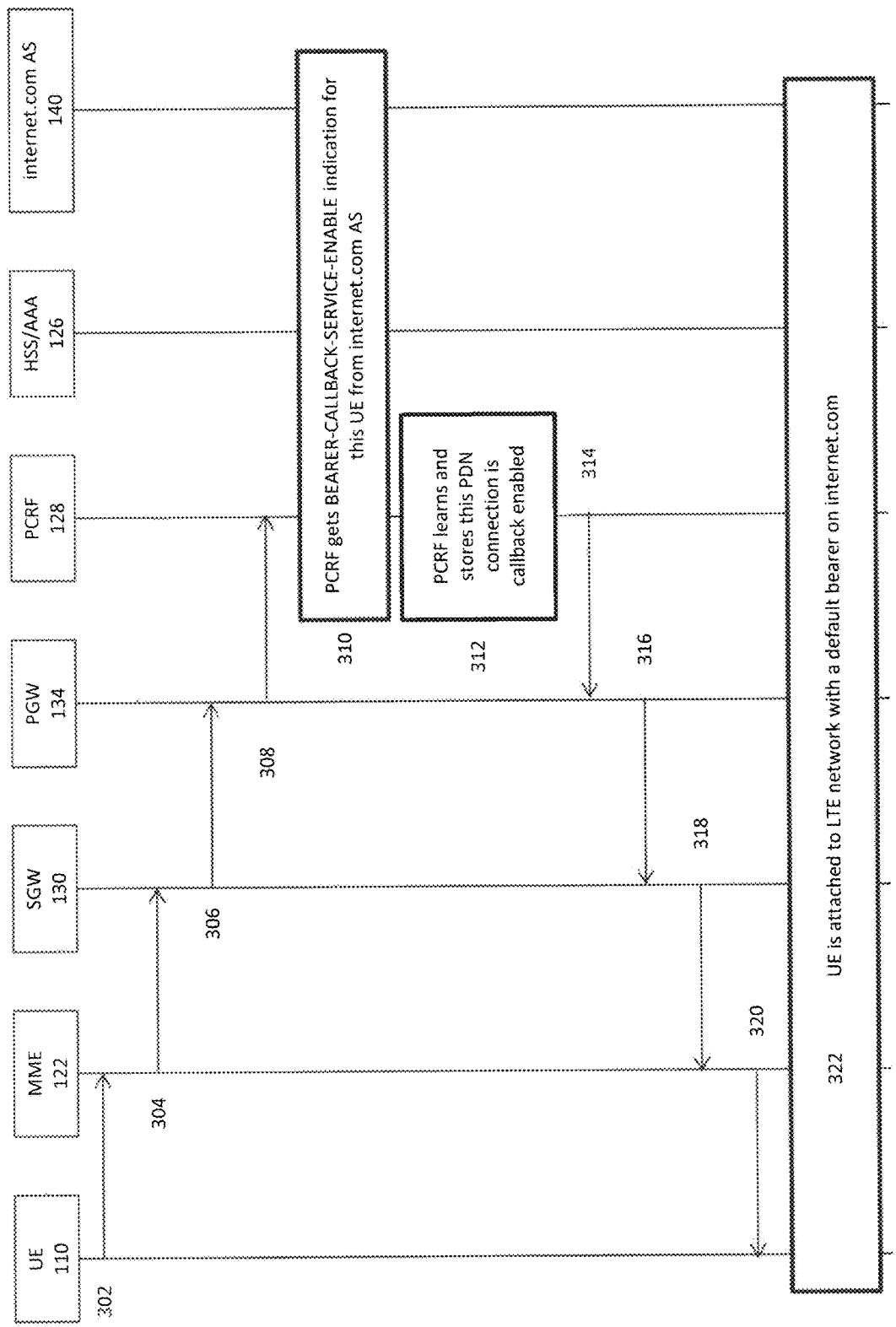
FIGS. 3A and 3B are exemplary call flow diagrams illustrating a method for providing callback services from a policy and rules charging function (PCRF), according to some embodiments.
Figure 3B:
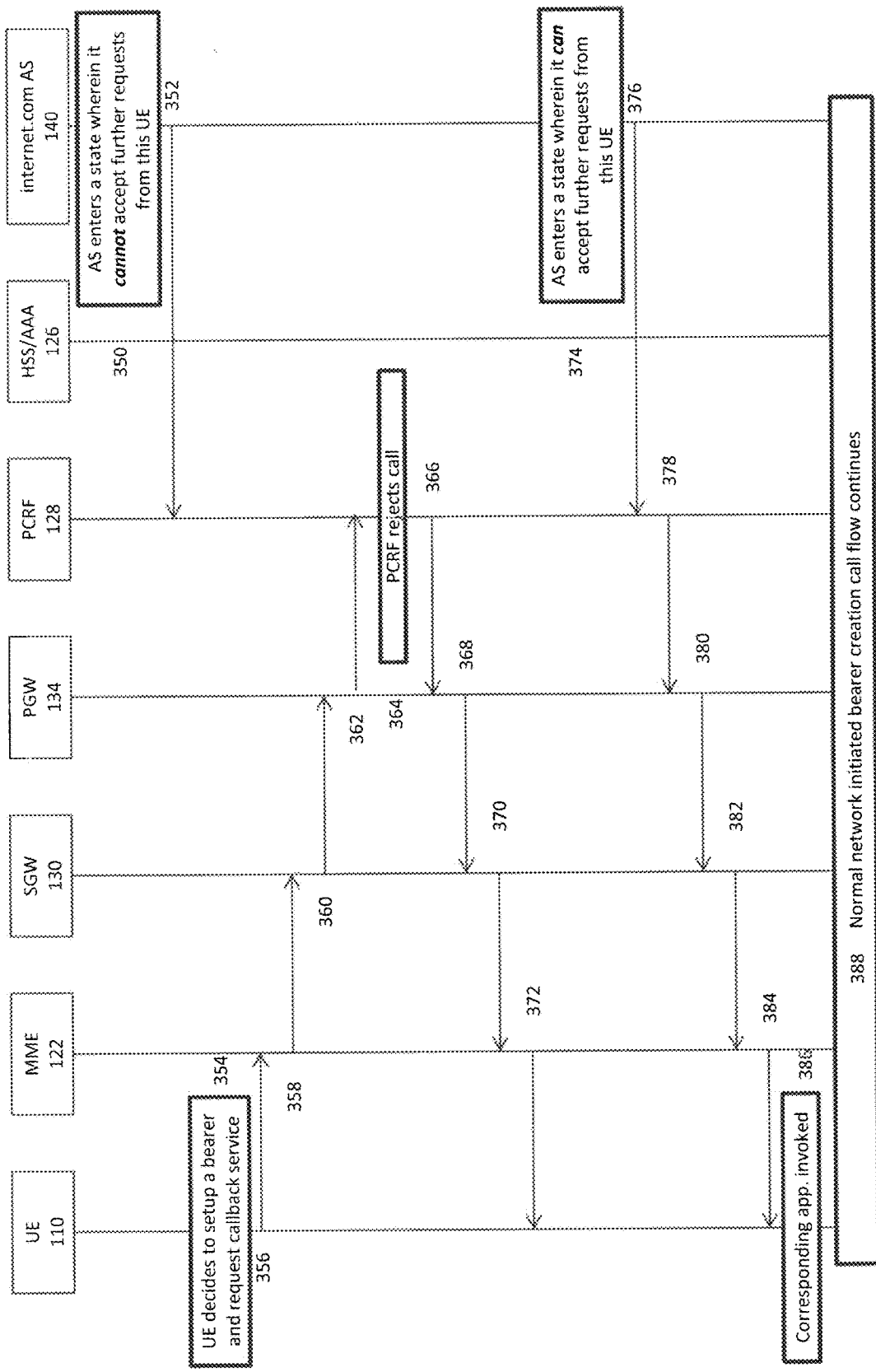

FIGS. 3A and 3B depict an exemplary call flow according to some embodiments in which the exemplary internet.com application server 140 is controlled by the same service provider that provisions PGW 134 and PCRF 128. Since PCRF 128 and AS 140 are controlled by the same service provider, AS 140 can communicate its load condition, including whether or not it is in a congested state, to PCRF 128 directly. PCRF 128, rather than PGW 134, can therefore be made responsible for keeping track of whether certain PDN connections for certain UEs are callback-enabled, for determining when the network is capable of accepting new bearers again, and for instructing PGW 134 to reject new bearers/pre-empt existing bearers as well as send callback messages at the appropriate times.

In FIG. 3A, UE 110 sends an Initial Attach message to MME 122 (flow 302). MME 122 then forwards the Initial Attach message to SGW 130 (flow 304), which then forwards the message to PGW 134 (flow 306). PGW 134 then alerts PCRF 128 that it has received an Initial Attach message (flow 308). In some embodiments, PCRF 128 can determine itself whether UE 110 should receive bearer callback services, as was the case in FIG. 2A. In other embodiments, PCRF 128 can receive an indication from internet.com AS 140 that this particular UE 110 should receive bearer callback services (step 310, as illustrated in FIG. 3A). Regardless of how PCRF 128 learns that this particular UE 110 should receive callback services, PCRF 128 can then store in local memory a record that this PDN connection for this UE is callback enabled (step 312). PCRF 128 then sends an acknowledgement signal to PGW 134 (flow 314). PGW 134 can then send a response to SGW 130 that UE 110's attach request has been accepted (flow 316), which is then forwarded to MME 122 (flow 318) and then to UE 110 (flow 320). This response can include an indication to UE 110 that its connection is callback-enabled. By step 322, the UE 110 is attached to the LTE network with a default bearer on internet.com.

In FIG. 3B, AS 140 enters a state in which it cannot accept further application client requests from this UE (step 350). Rather than communicating this fact to PGW 134, or allowing PGW 134 to independently sense and infer this fact, as was the case in FIG. 2B, AS 140 can notify PCRF 128 directly that it cannot accept further requests from this UE (flow 352). Alternatively, PCRF 128 can independently sense and infer that AS 140 has entered such a state, e.g., by observing AS 140's response times or other behavior. As discussed above, AS 140 can enter such a state due to various factors, such as excessive load or congestion at AS 140, PGW 134, and/or eNodeB 112, or due to operator policy to reserve resources for more critical applications at certain times, or for certain users. Subsequently, UE 110 decides to setup a new dedicated bearer associated with a certain application (e.g., a peer-to-peer file-sharing application) and request callback service (step 354). UE 110 sends a dedicated bearer-setup request with a callback service indication to MME 122 (flow 356), which is then forwarded to SGW 130 (flow 358) and to PGW 134 (flow 360). PGW 134 then notifies PCRF 128 that it has received a dedicated bearer-setup request with a callback service indication from UE 110 (flow 362). In some embodiments, this bearer-setup request can take the form of a Dedicated-Bearer-Setup command between UE 110 and MME 122, and a Bearer-Resource-Command from MME 122 to SGW 130, and from SGW 130 to PGW 134.

Since PCRF 128 knows that AS 140 cannot accept further application client requests, PCRF 128 decides to reject the bearer creation request (step 364). At this step, PGW 134 can examine the bearer-setup request from UE 110 to see if UE 110 invoked a callback request. If UE 110 requested callback services, PCRF 128 examines its local memory and determines that the PDN connection for this UE is callback enabled. If the PDN connection for this UE 110 is callback enabled and if UE 110 requested callback services, PCRF 128 can then instruct PGW 134 to send a rejection message (in some embodiments, this can take the form of a Bearer Resource Command (BRC) Failure message) along with the generated reference cookie (flow 366). PGW 134 can then send the rejection message, along with the reference cookie, to SGW 130 (flow 368), which is then forwarded to MME 122 (flow 370) and then to UE 110 (372).

When UE 110 receives the rejection message with the generated reference cookie, it now knows that its bearer creation request associated with the application is rejected because the network is currently unable to accept new requests, but that PCRF 128 will send, via PGW 134, a callback message when it is able to accept new bearer creation requests. In some embodiments, UE 110 then associates the reference cookie with the application (e.g., the peer-to-peer file-sharing application) and saves the cookie and the association into local memory. In other embodiments, UE 110 can associate the reference cookie with the QoS of the bearer that was rejected.

At a later time, AS 140 enters a state wherein it can accept more application client requests from this UE (step 374). AS 140 then notifies PCRF 128 that it can accept more application client requests (flow 376). Alternatively, PCRF 128 can independently sense and infer that AS 140 has entered such a state, e.g., by observing AS 140's response times or other behavior. PCRF 128 then instructs PGW 134 to send a callback message, and provides the previously generated reference cookie to PGW 134 (flow 378). PGW 134 then sends the callback message containing the reference cookie to SGW 130 (flow 380), which is then forwarded to MME 122 (flow 382) and then to UE 110 (flow 384). When UE 110 receives the callback message with the reference cookie, it knows that the network is now able to accept more dedicated bearer creation requests. It then examines its local memory to determine the application associated with the received reference cookie, and invokes the corresponding application (e.g., the peer-to-peer file-sharing application) (step 386). In other embodiments, UE 110 examines its local memory to determine the QoS of the bearer that had previously been rejected, and then invokes an application that uses the determined QoS. The network then initiates normal network initiated bearer creation call flows (step 388).

The call flows described above in reference to FIGS. 3A and 3B can also be adapted for other embodiments. For example, while FIG. 3B illustrates the case where a UE decides to setup a new bearer, the call flow can be adapted for the case where PGW 134 pre-empts an existing bearer between UE 110 and PGW 134. In this case, PCRF 128 could instruct PGW 134 to send a pre-emption message instead of a rejection message to UE 110 via SGW 130 and MME 122, along with the generated reference cookie. When AS 140 enters a state where it can allow PGW 134 to resume the pre-empted bearer, AS 140 can notify PCRF 128, which can then instruct PGW 134 to send a callback message to UE 110 via SGW 130 and MME 122 as described above.

The call flows described above in reference to FIGS. 3A and 3B can also be adapted for embodiments in which UE 110 is given a choice to continue or terminate its connection to AS 140. As an example, rather than completely rejecting UE 110's new bearer request, or pre-empting UE 110's existing bearer, AS 140 can notify PCRF 128 to give UE 110 a choice to (i) continue setting up a new bearer, or to continue using its existing bearer, or (ii) abandon its attempt to setup a new bearer or continue using its existing bearer. UE 110 can choose between options (i) and (ii) based on user input supplied by a user of the UE, or automatically based on predetermined programmable parameters. If UE 110 chooses to abandon its attempt to setup a new bearer or continue using its existing bearer, PCRF 128 can instruct PGW 134 to send UE 110 a callback message when connection conditions are more favorable, e.g., the network can accept new bearers at a lower cost, or the network can provide better QoS. In this way, UE 110 can choose to discontinue its connection now in favor of a connection later when connection conditions are more favorable, e.g., the costs of remaining connected will be lower, or when the network can provide better QoS. This feature can be useful for allowing UE 110 to voluntarily delay certain applications to times of the day when network traffic is generally lower to take advantage of cheaper connection rates or faster data transfer speeds. In this case, PCRF can instruct PGW 134 to send a delay notification instead of a rejection message to UE 110 via SGW 130 and MME 122, along with the generated reference cookie. If UE 110 elects to abandon its attempt to setup a new bearer or continue using its existing bearer, UE 110 can send a delay-accept message to PGW 134 via MME 122 and SGW 130. When AS 140 enters a state in which it can provide more favorable connections, e.g., accept new application client connections at a cheaper rate (according to an operator's policy) or at a certain QoS level, AS 140 could notify PCRF 128 to instruct PGW 134 to send a callback message to UE 110 via SGW 130 and MME 122 as described above.

In some embodiments, the callback messages initiated by either PGW 134 (in the embodiments described in FIGS. 2A and 2B) or by PCRF 128 (in the embodiments described in FIGS. 3A and 3B) can be sent in a phased manner (based on regular periods or various random times) after the network exits the state that had prompted the bearer rejection/pre-emption in the first place. In this way, the network will avoid being overwhelmed by a sudden flood of bearer creation requests that had been accumulating while the network was in the congested state. The network can also prioritize the order in which it sends callback messages.

In other embodiments, the callback messages described above can be used in place of or in parallel with automatic back-off timers that, as described above, cause a UE to wait for a randomly or predetermined time before attempting to establish a new bearer with a PGW. The combination of both callback messages and automatic back-off timers give operators additional flexibility to apply either or both approaches to certain UEs, to certain bearers, or to certain UE/PDN combinations. In yet other embodiments, a network operator can impose additional charges on UEs that wish to use bearer callback services.

FIG. 4 depicts an exemplary table 402 that can be stored in the memory of PGW 134 in the embodiments depicted in FIGS. 2A and 2B, and in the memory PCRF 128 in the embodiments depicted in FIGS. 3A and 3B. The table 402 can include a UE identifier field 404, a network identifier field 406, a callback service requested field 408 and a reference cookie field 410. UE identifier field 404 includes unique identifiers which can be used to distinguish different UEs 110. Network identifier field 406 includes unique identifiers for different access networks 140. For each UE and access network combination, the callback service requested field 408 can indicate "YES" that callback service is enabled and/or requested for this connection, or "NO" that callback service is not enabled and/or requested. If callback service is enabled for a particular connection, reference cookie field 410 can include a randomly generated unique number that serves as a reference cookie for that connection. As discussed above, this reference cookie can be used by the UE 110 to correlate a callback request with a particular application to be invoked.

One example reference cookie associated with a certain bearer can comprise an APN-identifier associated with that bearer, the Quality of Service Class Identifier (QCI) and Allocation Retention Parameter (ARP) of that bearer, and a two-digit random number. Reference cookies of this format can be preferable for reducing confusion. Since a UE can attach to multiple APN's through the same PGW, but a UE can attach to a particular APN only through a single PGW, having the APN-identifier in the reference cookie can avoid any confusion that could be caused by two PGW coincidentally generating the same random number. The random number can be useful for referencing a particular application or group of applications. For example, suppose one bearer is used for a set of multiple applications, but the callback request is provided for a specific application within that set of applications. In that instance, the random number can be useful for distinguishing which application within the set of applications the callback request pertains to. Note that this example reference cookie format can result in the same cookie being sent to two different UEs. Under some embodiments, this should not be a problem because the reference cookie will be used only within a particular UE to identify the application to invoke in response to a callback request. If it becomes necessary for reference cookies to be unique across multiple UEs, a UE identifier can be added to the reference cookie.

This exemplary table 402 can be used by PGW 134 and/or PCRF 128 to determine whether or not to send a callback message to a UE 110, and if so, what reference cookie to include. The fields listed in table 402 are exemplary only, and certain fields may be modified or replaced. Other fields may also be included, such as the application that corresponds to a certain reference cookie, or whether a bearer had been rejected, pre-empted, or voluntarily delayed for a certain UE.

FIG. 5 depicts an exemplary table 502 that can be stored in the memory of UE 110. The table 502 can include a reference cookie field 504 and an application field 506. Reference cookie field 504 includes the randomly generated unique reference cookie discussed above in relation to FIGS. 2A, 2B, 3A, 3B and 4. Application field 506 includes the UE applications that correspond to each reference cookie stored in the reference cookie field 504. This exemplary table can be used by UE 110 to determine what application corresponds to a reference cookie received as part of a callback message, and to invoke that application when it creates a new bearer in response to the callback message. In other embodiments, application field 506 can be replaced by a QoS field (not shown) that shows the QoS of the bearer that had previously been rejected and/or pre-empted when the reference cookie was generated. In these embodiments, this exemplary table can be used by UE 110 to determine the QoS of the application that should be invoked when it creates a new bearer in response to the callback message.

Figure 6:
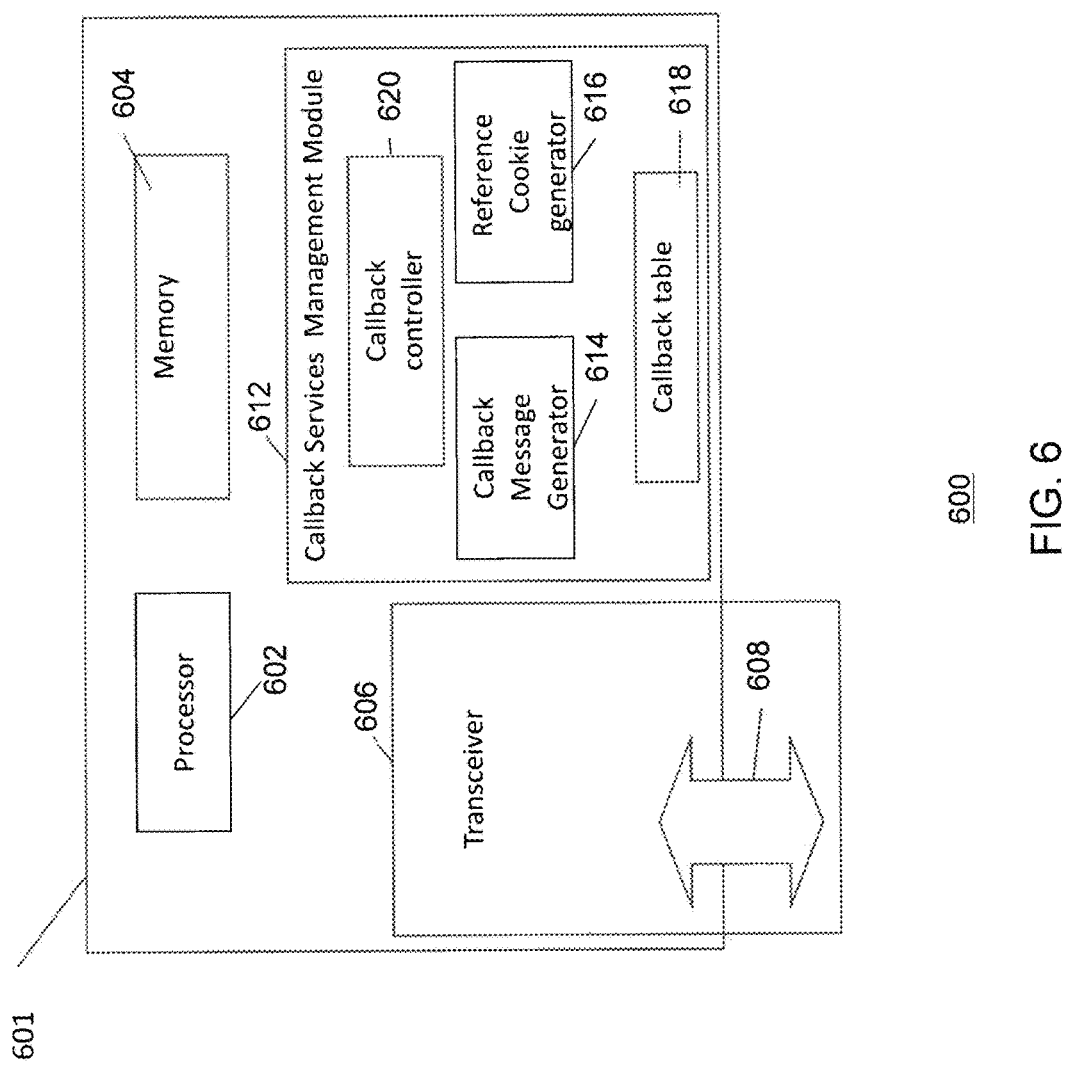
FIG. 6 is a logical diagram illustrating one implementation of an intermediary network node for implementing bearer callback services, according to some embodiments.

FIG. 6 illustrates a logical view 600 of an intermediate network node 601 (such as PGW 134 or PCRF 128) that implements callback services in accordance with certain embodiments. The intermediary node includes a transceiver 606 that implements an interface 608, a processor 602, a memory 604, and a callback services management module 612 that is provided using processor 602 and memory 604, wherein the callback services management module includes a callback message generator 614, a reference cookie generator 616, a callback table 618, and a callback controller 620.

Interface 608 includes one or more physical connections that can be either wired or wireless to communicate information to and from intermediary network node 601. Intermediate network node 601 transmits and receives radio, electrical, optical or other data signals on interface 608 to and from access networks (such as AS 140), to and from other network nodes (such as MME 122, or HSS/AAA 126), and, in certain embodiments, to and from user equipment (such as UE 110). Processor 602 can be one or more integrated circuits that are multipurpose, programmable, clock-driven, register-based electronic devices that accept binary data as input, processes it according to instructions stored in its memory, and provides results as output. In some embodiments, processor 602 can be constructed for a specific purpose such as to provide callback services.

Memory 604 can be any type of computer readable medium such as random access memory (RAM), programmable read-only memory (PROM), a field programmable gate array (FPGA), flash memory, optical disk drive, or magnetic storage medium. Memory 604 can be used to store computer programs or logic that can be run on processor 602.

Processor 602 and memory 604 can be used to provide callback services management module 612, which includes callback message generator 614, reference cookie generator 616, callback table 618, and callback controller 620. In some embodiments, callback table 618 can be implemented as table 402 depicted in FIG. 4. For example, callback services management module 612 can include information stored in memory 604 (such as callback table 618) upon which action is taken by processor 602. In some embodiments, callback services management module 612 and its sub-components can be implemented as a module that is a combination of hardware and software—in these embodiments, callback services management module 612 may utilize its own dedicated processor and memory, or module 612 may utilize processor 602 and memory 604. In other embodiments, callback services management module 612 can be implemented only as software which is stored in memory 604 and run on processor 602.

Callback services management module 612 can include callback controller 620, which can be responsible for determining when network node 601 should pre-empt an existing bearer, reject a new bearer creation request, or offer a UE an option to delay a connection, as discussed above in relation to FIGS. 2A, 2B, 3A and 3B. In some embodiments, callback controller 620 can base its determination on messages received from other network nodes (e.g., AS 140, or PCRF 128), such as load information or congestion states of said other network nodes. In other embodiments, callback controller 620 can base its determination based on the traffic load and/or congestion state of network node 601, such as number of bearers being handled, or processes being run. Callback controller 620 can also receive, via interface 608, messages from other network nodes indicating whether certain UE/PDN connections should receive callback services, and, if so, make a record of this in callback table 618 (which can be stored in memory 604). If callback controller 620 determines that an existing bearer should be pre-empted, a new bearer creation request should be rejected, and/or a UE should be offered an option to delay a connection, and if callback controller 620 determines that a certain UE/PDN connection should receive callback services, callback controller 620 can use reference cookie generator 616 to generate a random unique number to serve as a reference cookie, and store this reference cookie in callback table 618. Once again, callback table 618 can be implemented as table 402 depicted in FIG. 4. Callback services management module can then send a pre-emption, rejection, or delay message via interface 608, as appropriate.

Callback controller 620 can also be responsible for determining when network node 601 should send a callback message because the network is now able to accept new bearer creation requests. As before, callback controller 620 can base its determination on messages received from other network nodes (e.g., AS 140, or PCRF 128), such as load information or congestion states of said other network nodes. In other embodiments, callback controller 620 can base its determination based on the traffic load and/or congestion state of network node 601, such as number of bearers being handled, or processes being run. Once callback controller 620 determines that a callback message should be sent, it can use callback message generator 614 to generate a callback message. Callback message generator 614 can use callback table 618 to determine whether a connection should be given callback services, and if so, what reference cookie to send along with its callback message.

Figure 7:
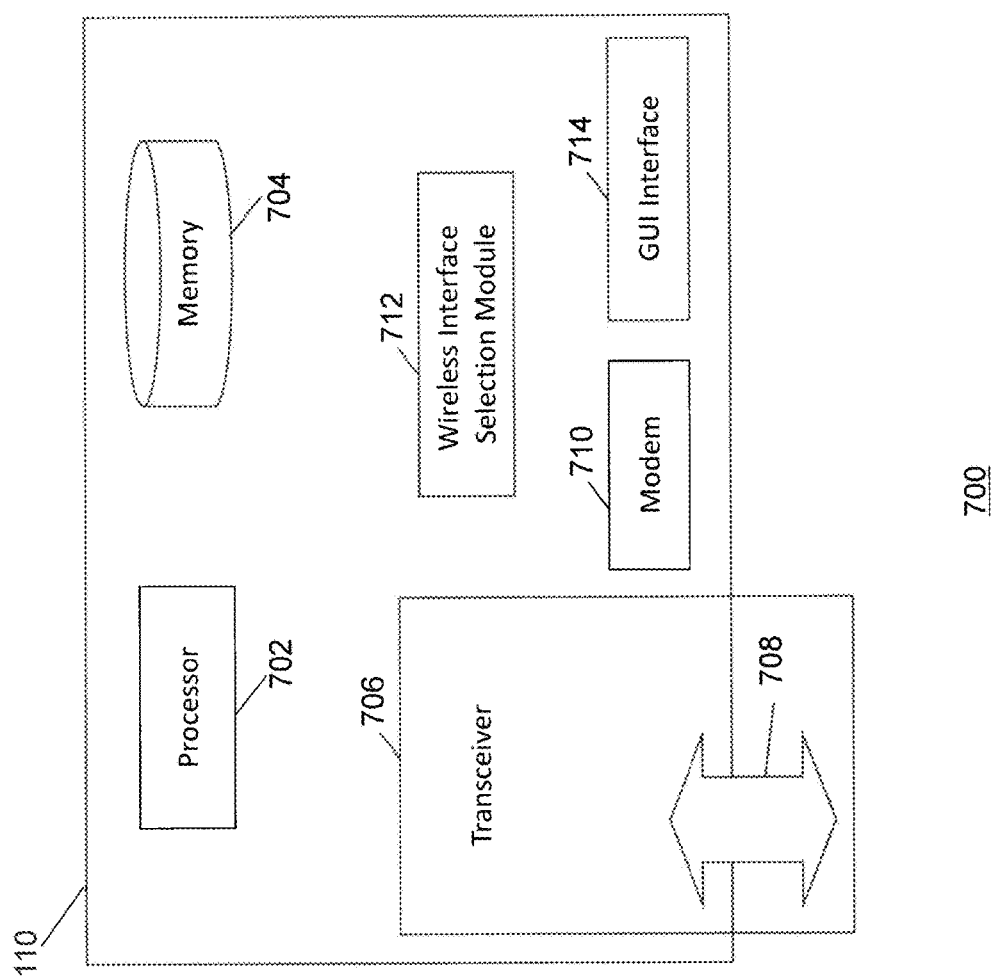
FIG. 7 is a logical diagram illustrating one implementation of a UE, according to some embodiments.

FIG. 7 illustrates a logical view 700 of user equipment (UE) 110 in accordance with certain embodiments. The UE 110 can include a processor 702, a memory 704, a transceiver 706 including an interface 708, a modem 710, a wireless interface selection module 712, and a GUI interface 714.

The transceiver 706 includes a transmitter and a receiver. The transmitter and the receiver can be integrated into a single chip or can be embodied in separate chips. The transceiver 706 can also include an interface 708 that provides an input and/or output mechanism to communicate with other network devices. The interface 708 can measure the wireless signal strengths of wireless interfaces such as base stations and access points. The interface 708 can be implemented in hardware to send and receive signals in a variety of mediums, such as optical, copper, and wireless, and in a number of different protocols some of which may be non-transient.

The modem 710 is configured to implement modulation and framing of signals according to one or more communication standards. The communication standards include the cellular standards defined under 3GPP.

The wireless interface selection module 712 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 712 can select the serving wireless interface by analyzing data load information associated with wireless interfaces. In certain embodiments, the wireless interface selection module 712 can be configured to attach to a wireless interface handling the least amount of data traffic and/or with more available resources. In certain embodiments, the wireless interface selection module 712 can also analyze additional information to decide to which wireless interface to connect. For example, the wireless interface selection module 712 can use one or more of the following: the load condition associated with the candidate wireless interfaces, the wireless signal strength associated with the candidate wireless interfaces, and a configuration status on the wireless interface selection module 712 indicating whether the UE 110 favors the cellular network or the WLAN.

The wireless interface selection module 712 can be implemented in software using memory 704 such as a non-transitory computer readable medium, a programmable read only memory (PROM), or flash memory. In some embodiments, the memory 704 can be used to implement the table 502 depicted in FIG. 5, which keeps track of which application or QoS corresponds to a particular reference cookie. The software can run on a processor 702 that executes instructions or computer code. The wireless interface selection module 712 may also be implemented in hardware using an application specific integrated circuit (ASIC), programmable logic array (PLA), or any other integrated circuit.

The GUI interface 714 can provide communication with an input and/or output mechanism to communicate with UE users. UE users can use input/output devices to send/receive data to/from the UE 110 over the GUI interface 110. Input/output devices can include, but are not limited to, a keyboard, a screen, a touch screen, a monitor, and a mouse. The GUI interface 714 can operate under a number of different protocols. The GUI interface 714 can be implemented in hardware to send and receive signals in a variety of mediums, such as optical, copper, and wireless.

The UE 110 described above can communicate with a plurality of radio access networks using a plurality of access technologies and with wired communication networks. The UE 110 can be a smart phone offering advanced features and capabilities, such as word processing, web browsing, gaming, e-book capabilities, an operating system, and a full keyboard. The UE 110 may run an operating system such as Symbian OS, iPhone OS, RIM's Blackberry, Windows Mobile, Linux, Palm WebOS, and Android. The screen may be a touch screen that can be used to input data to the UE 110 and the touch screen can be used instead of the full keyboard. The UE 110 may have the capability to run applications or communicate with applications that are provided by servers in the communication network. The UE 110 can receive updates and other information from these applications on the network.

The UE 110 also encompasses many other devices such as televisions (TVs), video projectors, set-top boxes or set-top units, digital video recorders (DVR), computers, netbooks, laptops, and any other audio/visual equipment that can communicate with a network. The UE 110 can also keep global positioning coordinates, profile information, or other location information in its stack or memory. The UE 110 can have a memory such as a computer readable medium, flash memory, a magnetic disk drive, an optical drive, a programmable read-only memory (PROM), and/or a read-only memory (ROM). The UE 110 can be configured with one or more processors 702 that process instructions and run software that may be stored in memory 704. The processor 702 can also communicate with the memory 704 and interfaces to communicate with other devices. The processor 702 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 110 can also provide a variety of user interfaces (e.g., GUI Interface 714) such as a keyboard, a touch screen, a trackball, a touch pad, and/or a mouse. The UE 110 may also include speakers and a display device in some embodiments.

Any of the network components specified in this disclosure, including PGW 134, PCRF 128, and AS 140 (any of which can be implemented as or in combination with intermediate network node 601 depicted in FIG. 6), can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data interworking function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a gateway, the gateway can be implemented as any combination of the following: an xGSN, an xGW, an xGW-SGW, and an xGW-PGW.

Figure 8:
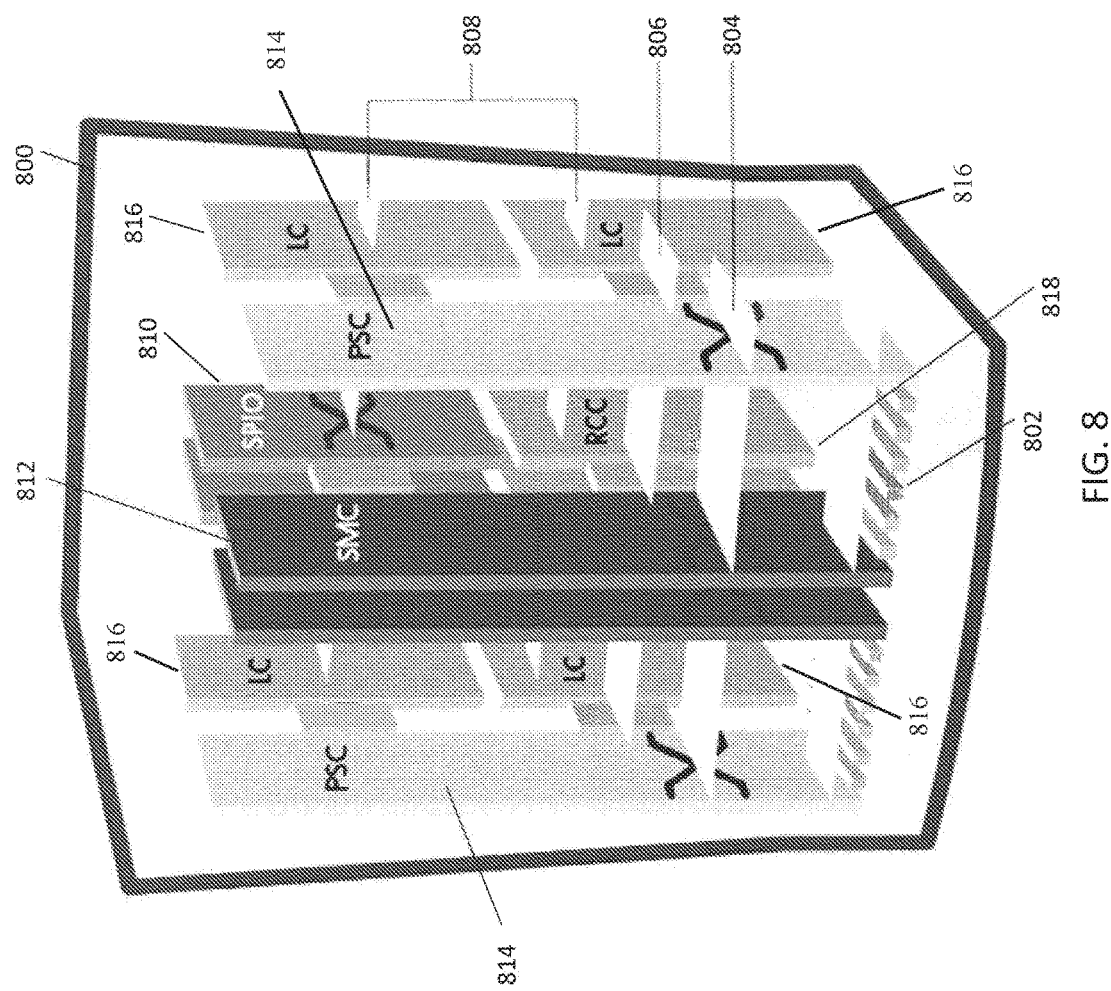
FIG. 8 illustrates the implementation of a network device, according to some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 8 illustrates the implementation of a network device 800 in accordance with some embodiments. The network device 800 includes slots 802 for loading application cards and line cards. A midplane can be used in the network device 800 to provide intra-network device communications, power connections, and transport paths between the various installed cards. The midplane can include buses such as a switch fabric 804, a control bus 806, a system management bus, a redundancy bus 808, and a time division multiplex (TDM) bus. The switch fabric 804 is an IP-based transport path for user data throughout the network device 800 implemented by establishing inter-card communications between application cards and line cards. The control bus 806 interconnects the control and management processors within the network device 800. The network device management bus provides management of system functions such as supplying power, monitoring temperatures, board status, data path errors, card resets, and other failover features. The redundancy bus 808 provides transportation of user data and redundancy links in the event of hardware failures. The TDM bus provides support for voice services on the system.

The network device 800 supports at least four types of application cards: a switch processor I/O card (SPIO) 810, a system management card (SMC) 812, a packet service card (PSC) 814, and a packet accelerator card (not shown). Other cards used in the network device 800 include line cards 816 and redundant crossbar cards (RCC) 818. The line cards 816, when loaded in the network device 800, provide input/output connectivity to the network and other devices, as well as redundancy connections. The line cards 816 include interfaces to the network through Ethernet, Fiber Optic, and/or any other communication mediums. The redundant crossbar card (RCC) 818 includes a non-blocking crossbar and connections to each of the cards in the network device 800. This allows a redundant connection to be made through the redundant crossbar card 818 from any one card to any other card in the network device 800. The SPIO card 810 serves as a controller of the network device 800 and is responsible for such things as initializing the network device 800 and loading software configurations onto other cards in the network device 800.

The system management card (SMC) 812 and switch processor card (not shown) are system control and management cards for managing and controlling other cards in the network device 800. The packet accelerator card (PAC) and packet service card (PSC) 814 provide packet processing, context processing capabilities, and forwarding capabilities among other things. The PAC and PSC 814 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 800 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 800 can be divided into a series of tasks that perform specific functions. These tasks communicate with each other as needed to share control and data information throughout the network device 800. A task is a software process that performs a specific function related to system control or session processing. Three types of tasks operate within the network device 800 in some embodiments: critical tasks, controller tasks, and manager tasks. The critical tasks control functions that relate to the ability of the network device 800 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 800) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A 10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 110), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 9:
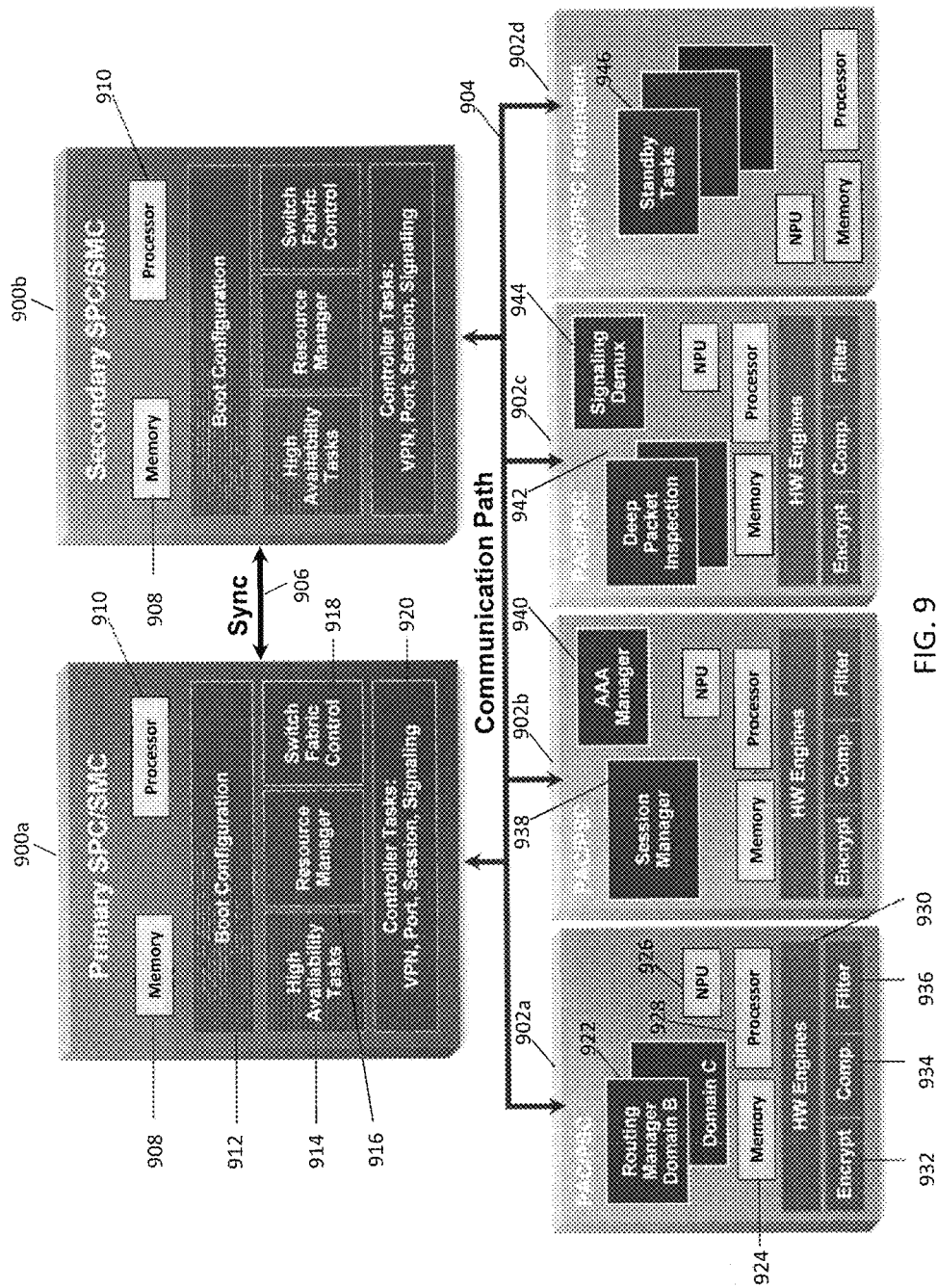
FIG. 9 is a logical view of the software architecture of a network device, according to some embodiments.

FIG. 9 illustrates a logical view 900 of the software architecture of a network device (e.g., network device 800) in accordance with certain embodiments. As shown, the software and hardware can be distributed within the network device and across different circuit boards, processors, and memory. FIG. 9 includes a primary switch processor card (SPC)/system management card (SMC) 900a, a secondary SPC/SMC 900b, PAC/PSC 902a-902d, a communication path 904, and a synchronization path 906. The primary SPC/SMC 900a and the secondary SPC/SMC 900b each includes a memory 908, a processor 910, a boot configuration 912, high availability tasks 914, resource manager 916, switch fabric control 918, and controller tasks 920.

The SPC/SMC 900 (both primary and secondary) manages and controls the network device including the other cards in the network device. The SPC/SMC 900 can be configured in a primary and secondary arrangement that provides redundancy and failsafe protection. The modules or tasks running on the SPC/SMC 900 are related to network device wide control and management. The boot configuration task 912 includes information for starting up and testing the network device. The network device can also be configured to startup in different configurations and providing different implementations. These can include which functionalities and services are capable of running on the SPC/SMC 900. The high availability task 914 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 900 or a PAC/PSC 902, while some processor intensive tasks can also be performed across multiple PACs/PSCs to utilize multiple CPU resources. Distribution of these tasks is invisible to the user. The switch fabric control 918 controls the communication paths in the network device. The controller tasks module 920 can manage the tasks among the resources of the networks to provide, for example, VPN services, assign ports, and create, delete, and modify sessions for UE 110.

The PAC/PSC 902 is a high-speed processing card that is designed for packet processing and the tasks involved with providing various network functionalities on the network device. The PAC/PSC 902 include a memory 924, a network processing unit (NPU) 926, a processor 928, a hardware engine 930, an encryption component 932, a compression component 934, and a filter component 936. Hardware engines 930 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 902 is capable of supporting multiple contexts. The PAC/PSC 902 is also capable of running a variety of tasks or modules. PAC/PSC 902a provides routing managers 922 with each covering routing of a different domain. PAC/PSC 902b provides a session manager 938 and an AAA manager 940. The session manager 938 manages one or more sessions that correspond to one or more UE 108. A session allows a UE 110 to communicate with the network for voice calls and data. The AAA manager 940 manages accounting, authentication, and authorization with an AAA server in the network. PAC/PSC 902c provides a DPI task 942 and a signaling demux 944. The DPI task 942 provides inspection of packet information beyond layer 4 for use and analysis by the network device. The signaling demux 944 can provide scalability of services in combination with other modules. PAC/PSC 902d provides redundancy through standby tasks 946. Standby tasks 946 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A network apparatus in a core network, comprising:
an interface configured to communicate with user equipments (UEs) via a wireless network; and
a processor in communication with the interface;
the network apparatus configured to
send, at a first time via the interface, a rejection message to a UE indicating that a bearer associated with the UE is rejected or pre-empted, the rejection message including a reference cookie,
send, at a second time after the first time via the interface, a callback message indicating to the UE that the network apparatus is able to accept a new bearer associated with the UE, the callback message including the reference cookie,
wherein the rejection message gives the UE an option to (i) establish a bearer immediately, or (ii) voluntarily delay establishing a bearer until the network apparatus sends, at the second time, the callback message, and wherein the callback message is sent at the second time only if the network apparatus receives an indication from the UE that the UE has chosen to voluntarily delay establishing a bearer.

2. The network apparatus of claim 1, wherein the rejection message to the UE is sent in response to a request from the UE to create a new bearer between the UE and the network apparatus.

3. The network apparatus of claim 1, wherein the rejection message to the UE is sent when the network apparatus determines that an existing bearer between the UE and the network apparatus should be pre-empted.

4. The network apparatus of claim 1, wherein the network apparatus determines when to send the rejection message and the callback message based on (i) load conditions at a packet data network gateway (PGW), (ii) load conditions at an application server (AS), or (iii) load conditions at a radio base station.

5. The network apparatus of claim 1, wherein the network apparatus is a packet data network gateway (PGW).

6. The network apparatus of claim 1, wherein the network apparatus is a policy charging rules function (PCRF).

7. The network apparatus of claim 1, wherein the network apparatus is further configured to receive a request from the UE for the callback message, and to provide the callback message only if the request is received.

8. A method for providing bearer callback services, comprising:
sending, to a user equipment (UE) from a network apparatus, at a first time, a rejection message indicating that a bearer associated with the UE is rejected or pre-empted, the rejection message including a reference cookie; and
sending, to the UE from the network apparatus, at a second time after the first time, a callback message indicating that the network apparatus is able to accept a new bearer associated with the UE, the callback message including the reference cookie;
wherein the rejection message gives the UE an option to (i) establish a bearer immediately, or (ii) voluntarily delay establishing a bearer until the network apparatus sends, at the second time, the callback message;
wherein the method further comprises receiving, at the network apparatus from the UE, an indication that the UE has chosen to (i) establish the bearer immediately, or (ii) voluntarily delay establishing the bearer; and
wherein the callback message is sent at the second time only if the network apparatus receives an indication from the UE that the UE has chosen to voluntarily delay establishing a bearer.

9. The method of claim 8, wherein the rejection message to the UE is sent in response to a request from the UE to create a new bearer between the UE and the network apparatus.

10. The method of claim 8, wherein the rejection message to the UE is sent when the network apparatus determines that an existing bearer between the UE and the network apparatus should be pre-empted.

11. The method of claim 8, further comprising
determining to send the rejection message based on (i) load conditions at a packet data network gateway (PGW), (ii) load conditions at an application server (AS), or (iii) load conditions at a radio base station; and
determining to send the callback message based on (i) load conditions at the PGW, (ii) load conditions at the AS, or (iii) load conditions at the radio base station.

12. The method of claim 8, wherein the network apparatus is a packet data network gateway (PGW).

13. The method of claim 8, wherein the network apparatus is a policy charging rules function (PCRF).

14. The method of claim 8, further comprising
receiving, at the network apparatus, a request from the UE for the callback message;
wherein the callback message is sent only if the request is received.

15. A user equipment (UE) apparatus, comprising:
an interface configured to communicate with a wireless network;
a memory; and
a processor in communication with the interface and the memory;
wherein the UE apparatus is configured to:
receive, at a first time, a rejection message from a network apparatus indicating that a bearer associated with the UE apparatus is rejected or pre-empted, the rejection message including a reference cookie;
associate the reference cookie with an application or a Quality of Service (QoS) indicator;
store in the memory the association between the reference cookie with the application or the QoS indicator;
receive, at a second time after the first time, a callback message from the network apparatus indicating that the network apparatus is able to accept a new bearer associated with the UE, the callback message including the reference cookie;
establish, in response to the callback message, a new bearer with the network apparatus, wherein the new bearer is associated with either the application associated with the reference cookie, or the QoS indicator associated with the reference cookie;
determine, in response to the rejection message, whether to (i) establish a bearer immediately, or (ii) voluntarily delay establishing a bearer until the callback message is received from the network apparatus at the second time;
upon determining to establish the bearer immediately, send a request to the network apparatus to establish the bearer immediately; and
upon determining to voluntarily delay establishing the bearer and not establish the bearer immediately, send a delay acknowledgement message to the network apparatus indicating that the UE apparatus is: voluntarily delaying establishing the bearer, and requesting the callback message at the second time.

16. The UE apparatus of claim 15, wherein the determination in response to the rejection message is based on input received from a user of the UE apparatus.

17. The UE apparatus of claim 16, wherein the UE apparatus is further configured to send to the network apparatus a request for the callback message.

18. The network apparatus of claim 1, the network apparatus further configured to provide the callback message in response to a determination that the network apparatus is able to accept a new bearer requested by the UE and that a request for the callback message has been received from the UE.

* * * * *